(12) United States Patent
Narita et al.

(10) Patent No.: US 7,235,807 B2
(45) Date of Patent: Jun. 26, 2007

(54) NEAR FIELD ANALYSIS APPARATUS HAVING IRRADIATION-SIDE GUIDE LIGHT AND LIGHT-COLLECTION-SIDE GUIDE LIGHT

(75) Inventors: Yoshihito Narita, Hachioji (JP); Shigeyuki Kimura, Hachioji (JP); Fuminori Sato, Hachioji (JP); Atsushi Yamada, Hachioji (JP)

(73) Assignee: Jasco Corporation, Hachioji-shi, Tokyo (JP)

( * ) Notice: Subject to any disclaimer, the term of this patent is extended or adjusted under 35 U.S.C. 154(b) by 35 days.

(21) Appl. No.: 11/316,402

(22) Filed: Dec. 22, 2005

(65) Prior Publication Data
US 2006/0131493 A1 Jun. 22, 2006

(30) Foreign Application Priority Data
Dec. 22, 2004 (JP) .............................. 2004-370507

(51) Int. Cl.
*G01N 21/86* (2006.01)
(52) U.S. Cl. ............................. 250/559.29; 250/559.3
(58) Field of Classification Search .......... 250/559.29, 250/559.3, 548, 201.3, 201.2, 306, 307
See application file for complete search history.

(56) References Cited

U.S. PATENT DOCUMENTS 5,243,195 A * 9/1993 Nishi .......................... 250/548

OTHER PUBLICATIONS

Japanese Patent Abstract Publication No. 2001153785 published Jun. 8, 2001, one page.
Japanese Patent Abstract Publication No. 2001165842 published Jun. 22, 2001, one page.
Feige et al., "Calibration of a scanning probe microscope by the use of an interference-holographic position measurement system," Meas. Sci. Technol. 14 (2003) pp. 1032-1039.
Japanese Patent Abstract Publication No. 11-101743 published Apr. 13, 1999, one page.

* cited by examiner

*Primary Examiner*—Que T. Le
(74) *Attorney, Agent, or Firm*—Rankin, Hill, Porter & Clark LLP

(57) ABSTRACT

A near field analysis apparatus comprising: an irradiation optical system comprising an irradiation-side adjustable optical system for adjusting the position or angle of an optical axis thereof, and irradiating irradiation-side guide light onto an adjustment surface via the irradiation-side adjustable optical system; a light collecting optical system comprising a light-collection-side adjustable optical system for adjusting the position or angle of an optical axis thereof, and irradiating light-collection-side guide light onto the adjustment surface via the light-collection-side adjustable optical system; an irradiation-side adjustment device for adjusting the position or angle of the irradiation-side adjustable optical system such that the spots of the guide light, which are observed at the adjustment surface, match; and a light-collection-side adjustment device for adjusting the position or angle of the light-collection-side adjustable optical system such that the spots of the guide light, which are observed at the adjustment surface, match.

8 Claims, 11 Drawing Sheets

FIG. 7
FIG. 7A
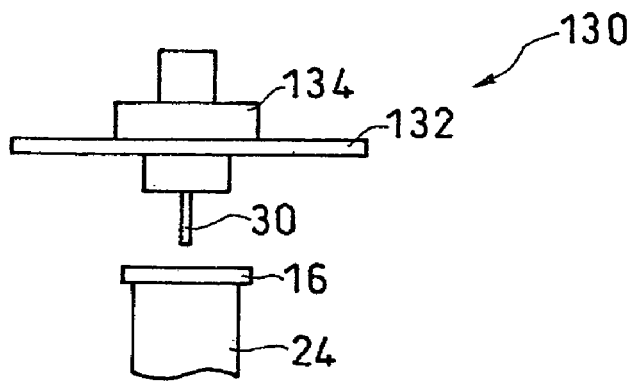
FIG. 7B
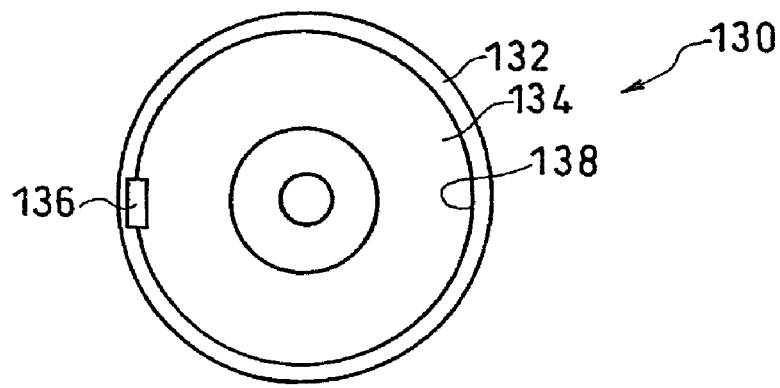
FIG. 7C
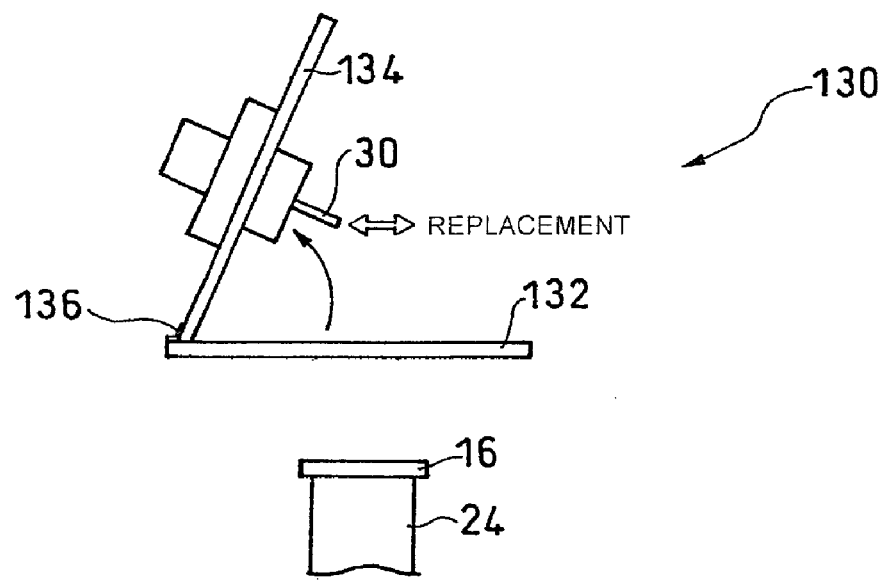

NEAR FIELD ANALYSIS APPARATUS HAVING IRRADIATION-SIDE GUIDE LIGHT AND LIGHT-COLLECTION-SIDE GUIDE LIGHT

RELATED APPLICATIONS

This application claims priority to the Japanese Patent Application 2004-370507 dated on Dec. 22, 2005 is hereby incorporated with reference for all purposes.

BACKGROUND OF THE INVENTION

1. Field of the Invention

The present invention relates to near field analysis apparatuses and, more particularly, to an improvement in the operability thereof.

2. Prior Art

In the related art, various types of near field analysis apparatuses are used to analyze objects smaller than the wavelength of light (for example, see Japanese Unexamined Patent Application Publication No. Hei-11-101743).

In such a near field analysis apparatus, for example, a minute sample to be measured is placed on a flat substrate. When excitation light is incident from a light source at an angle that causes total reflection from the rear surface of the substrate, the propagating light is completely reflected, however, a surface wave known as near field light is generated close to the front surface of the substrate and the sample. This surface wave is localized around the surface of the sample within a region whose size is equal to or smaller than the wavelength of the light.

Thus, in the near field analysis apparatus, when a near field probe having a sharp tip is inserted into the field of this near field light, the near field light is scattered. Part of the scattered light enters the near field probe, is guided to a detector, and is subjected to data processing. The near field analysis apparatus can thus determine the distance between the tip of the near field probe and the sample.

Therefore, by scanning the surface of the sample to be measured while controlling the distance in the vertical direction between the tip of the near field probe and the sample so that the intensity of the scattered light remains constant, it is possible to accurately determine the surface profile of the sample without making contact with the sample.

Furthermore, in this near field analysis apparatus, the tip of the near field probe is only placed in the field of the near field light and does not make contact with the object under measurement. Therefore, the near field analysis apparatus can observe an object smaller than the wavelength of light in a non-contact manner.

In such a near field analysis apparatus, there is still some scope for improvement in terms of the operability. However, in the related art, there is no known suitable technology that is capable of achieving this.

SUMMARY OF THE INVENTION

The present invention has been conceived in light of the problems of the related art described above, and an object thereof is to provide a near field analysis apparatus with improved operability.

In order to realize the above described object, a near field analysis apparatus according to the present invention includes an irradiation optical system and a light collecting optical system. The irradiation optical system includes an irradiation-side adjustable optical system and irradiates irradiation-side guide light onto an adjustment surface via the irradiation-side adjustable optical system. The light collecting optical system includes a light-collection-side adjustable optical system and irradiates light-collection-side guide light onto the adjustment surface via the light-collection-side adjustable optical system. The near field analysis apparatus also includes an irradiation-side adjustment device and a light-collection-side adjustment device. The near field analysis apparatus performs optical axis adjustment of the irradiation optical system and/or optical axis adjustment of the light collecting optical system using the irradiation-side adjustment device and/or the light-collection-side adjustment device, respectively.

Here, the irradiation-side optical system irradiates the sample with excitation light.

The light collecting optical system collects detection light produced by the interaction between the sample and the near field light generated by the excitation light.

The irradiation-side adjustable optical system can change the position and/or the angle of the irradiation-side optical axis thereof.

The light-collection-side adjustable optical system can change the position and/or the angle of the light-collection-side optical axis thereof.

The irradiation-side adjustment device adjusts the position and/or the angle of the irradiation-side adjustable optical system such that the spot of irradiation-side guide light and the spot of light-collection-side guide light, which are observed at the adjustment surface, match.

The light-collection-side adjustment device adjusts the position and/or the angle of the light-collection-side adjustable optical system such that the spot of irradiation-side guide light and the spot of light-collection-side guide light, which are observed at the adjustment surface, match.

<Guide Light Emitting Device>

The present invention preferably includes an irradiation-side guide light emitting device and a light-collection-side guide light emitting device.

The irradiation-side guide light emitting device makes the irradiation-side guide light, which forms the spot of the irradiation optical system at the adjustment surface, incident on the irradiation optical system.

The light-collection-side guide light emitting device makes the light-collection-side guide light, which forms the spot of the light collecting optical system at the adjustment surface, incident on the light collecting optical system.

<Light Spot Observing Device>

The present invention preferably includes a light spot observing device. The irradiation-side adjustment device preferably adjusts the position and/or the angle of the irradiation-side adjustable optical system such that the spot of the irradiation-side guide light and the spot of the light-collection-side guide light, which are observed with the light spot observing device, match at the adjustment surface. The light-collection-side adjustment device preferably adjusts the position and/or the angle of the light-collection-side adjustable optical system such that the spot of the irradiation-side guide light and the spot of the light-collection-side guide light, which are observed with the light spot observing device, match at the adjustment surface.

Here, the light spot observing device observes the spot of the irradiation-side guide light irradiated onto the adjustment surface via the irradiation optical system and the spot of the light-collection-side guide light irradiated onto the adjustment surface via the light collecting optical system.

<Adjustable Optical System>

In the present invention, the light-irradiation-side adjustable optical system preferably includes a light-irradiation-side focusing optical system. The light-collection-side adjustable optical system preferably includes a light-collection-side focusing optical system.

Here, the irradiation-side focusing optical system converges the irradiation-side guide light towards the adjustment surface.

The light-collection-side focusing optical system converges the light-collection-side guide light towards the adjustment surface.

In the present invention, the irradiation-side focusing optical system preferably includes an irradiation-side optical lens or an irradiation-side focusing mirror. The light-collection-side focusing optical system preferably includes a light-collection-side optical lens or a light-collection-side focusing mirror.

In the present invention, the irradiation-side focusing mirror preferably includes at least one mirror selected from the group consisting of a spherical mirror, an ellipsoidal mirror, a toroidal mirror, and a Cassegrainian mirror. The light-collection-side focusing mirror preferably includes at least one mirror selected from the group consisting of a spherical mirror, an ellipsoidal mirror, a toroidal mirror, and a Cassegrainian mirror.

In the present invention, the irradiation-side adjustable optical system preferably includes an irradiation-side angle varying device. The irradiation-side adjustable optical system focuses the irradiation-side guide light with respect to the adjustment surface based on the position of the irradiation-side focusing optical system in the optical axis direction. The irradiation-side adjustable optical system adjusts the position of the irradiation-side guide light on the adjustment surface based on the angle of the irradiation-side angle varying device. Likewise, the light-collection-side adjustable optical system preferably includes a light-collection-side angle varying device. The light-collection-side adjustable optical system focuses the light-collection-side guide light with respect to the adjustment surface based on the position of the light-collection-side focusing optical system in the optical axis direction. The light-collection-side adjustable optical system adjusts the position of the light-collection-side guide light on the adjustment surface based on the angle of the light-collection-side angle varying device.

The irradiation-side angle varying device is provided in front of the irradiation-side focusing optical system and can vary the angle about the central axis thereof.

The light-collection-side angle varying device is provided after the light-collection-side focusing optical system and can vary the angle about the central axis thereof.

In the present invention, the irradiation-side angle varying device is preferably an irradiation-side planar mirror. In addition, the light-collection-side angle varying device is preferably a light-collection-side planar mirror.

Because the near field analysis apparatus according to the present invention includes the irradiation-side adjustable optical system for the irradiation optical system, the light-collection-side adjustable optical system for the light collecting optical system, and the adjustment devices, the operability thereof is improved.

By providing the guide light emitting devices and the light spot observing device in the present invention, the operability of the near field analysis apparatus is further improved.

Since the adjustable optical systems each include the focusing optical system and the angle varying device, the operability of the near field analysis apparatus is further improved.

BRIEF DESCRIPTION OF THE DRAWINGS

FIGS. 7A, 7B, and 7C are diagrams showing an outlined configuration of a hatch-type probe exchange device in the near field analysis apparatus according to the embodiment of the present invention.

DESCRIPTION OF THE PREFERRED EMBODIMENT

A preferred embodiment of the present invention will be described below with reference to the drawings.

Figure 1:
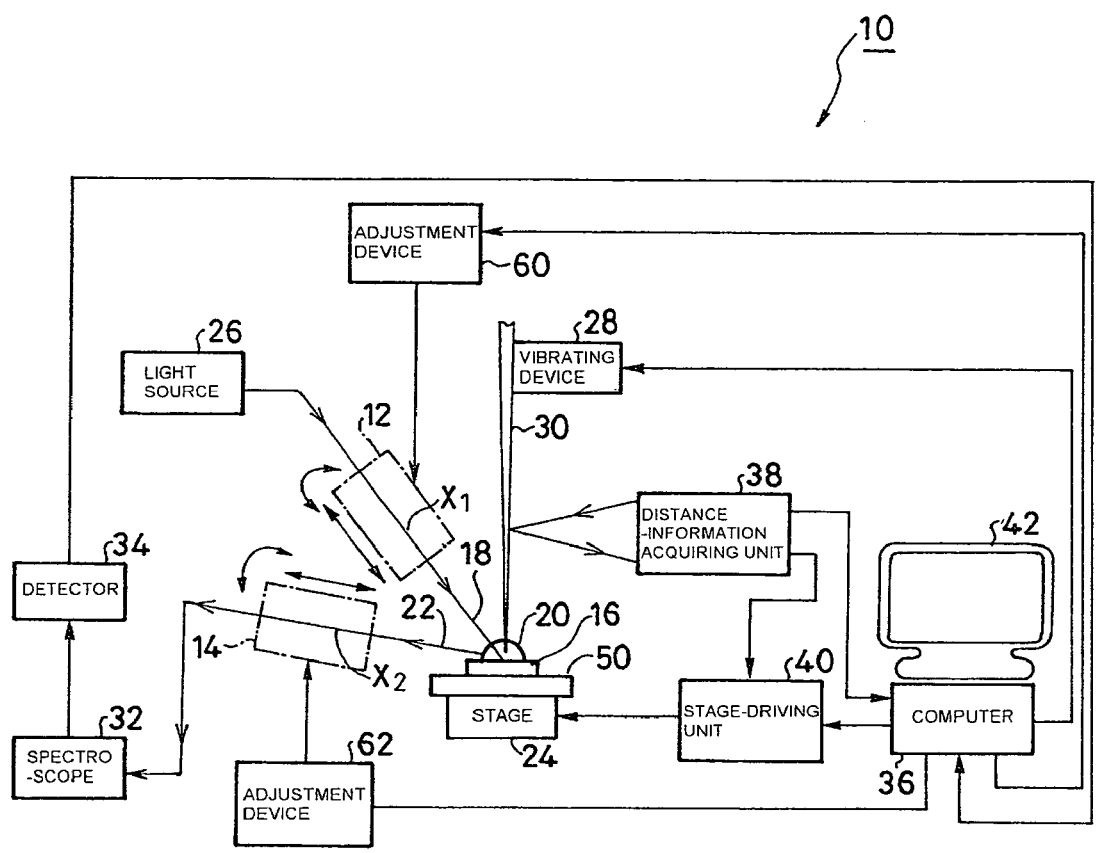
FIG. 1 is a diagram depicting an outlined configuration of a near field analysis apparatus according to an embodiment of the present invention.

FIG. 1 shows the schematic configuration of a near field analysis apparatus 10 according to an embodiment of the present invention.

The near field analysis apparatus 10 shown in this figure includes an irradiation optical system 12 and a light collecting optical system 14.

The irradiation optical system irradiates a sample 16 with excitation light 18.

The light collecting optical system 14 collects scattered light (detection light) 22 generated by the interaction between the sample 16 and near field light 20 generated by irradiation with the excitation light 18.

The near field analysis apparatus 10 performs near field measurement of the sample 16 based on the scattered light 22 of the near field light obtained by the light collecting optical system 14.

More specifically, in the near field analysis apparatus 10, for example, the minute sample 16 is placed on a stage 24. Then, in the near field analysis apparatus 10, when the excitation light 18, which comes from an excitation light source 26, is incident via the irradiation optical system 12, a surface wave known as the near field light 20 is generated near the surface of the sample 16. This surface wave is localized around the surface of the sample 16 in a region whose size is equal to or smaller than the wavelength of the light.

In the near field analysis apparatus 10, a near field probe 30 that is vibrated by a vibration device 28 is inserted into the field of the near field light 20 and scatters the near field light 20. In the near field analysis apparatus 10, some of this scattered light 22 is collected by the light collecting optical system 14 and is then guided to a detector 34 via a spectroscope 32. In the near field analysis apparatus 10, by subjecting the output from the detector 34 to data processing in a computer 36, it is possible to determine the distance between the tip of the near field probe 30 and the measurement surface of the sample 16.

The computer 36 controls the upward and downward motion of the stage 24 using a stage-driving unit 40 so that a distance signal indicating the distance between the near field probe 30 and the sample 16, which is obtained by a distance-information acquiring unit 38, is kept constant. The near field analysis apparatus 10 scans the measurement surface of the sample 16 while controlling the separation between the near field probe 30 and the sample 16 in this way to keep the separation constant. As a result, the near field analysis apparatus 10 can accurately determine the surface profile (unevenness) of the sample 16 without making contact therewith. The computer 36 displays the analysis results obtained in this way on a display 42.

Axial Adjustment Devices for Irradiation Optical System and Light Collecting Optical System In order to properly carry out near field analysis, it is necessary to perform axial adjustment of an irradiation optical system and a light collecting optical system.

Generally, in order to do so, a minute optical aperture which is defined in an adjustment surface is targeted and light is made incident thereon from one direction via the irradiation optical system. Light passing through the aperture is transmitted through the light collecting optical system and is detected, and adjustment is carried out so that the intensity of this detected light is maximized.

In the conventional method described above, the point where the intensity is accidentally maximized due to optical irregularities in the light spots of the irradiation optical system and the light collecting optical system is defined as the optimum adjustment position.

However, in the conventional method, the adjustment is not necessarily preformed such that the light spots of the irradiation optical system and the light collecting optical system truly match.

Furthermore, with the conventional method, when both the irradiation optical system and the light collecting optical system are at the same side with respect to the adjustment surface, they cannot be adjusted.

A characterizing feature of the present invention is that axial adjustment devices are provided for improving the operability when adjusting the irradiation optical system and the light collecting optical system. These axial adjustment devices emit adjustment guide light from the irradiation optical system side and from the light collecting optical system side, observe, with observation devices, the spots of the adjustment guide light formed on an adjustment surface, and perform axial adjustment of the irradiation optical system and the light collecting optical system so that these light spots match.

Accordingly, in this embodiment, an adjustment surface 50 is placed on the stage 24. During near field analysis, the sample 16 is mounted on the adjustment surface 50. On the other hand, during axial adjustment of the irradiation optical system 12 and the light collecting optical system 14, the sample 16 is removed from the adjustment surface 50.

Figure 2:
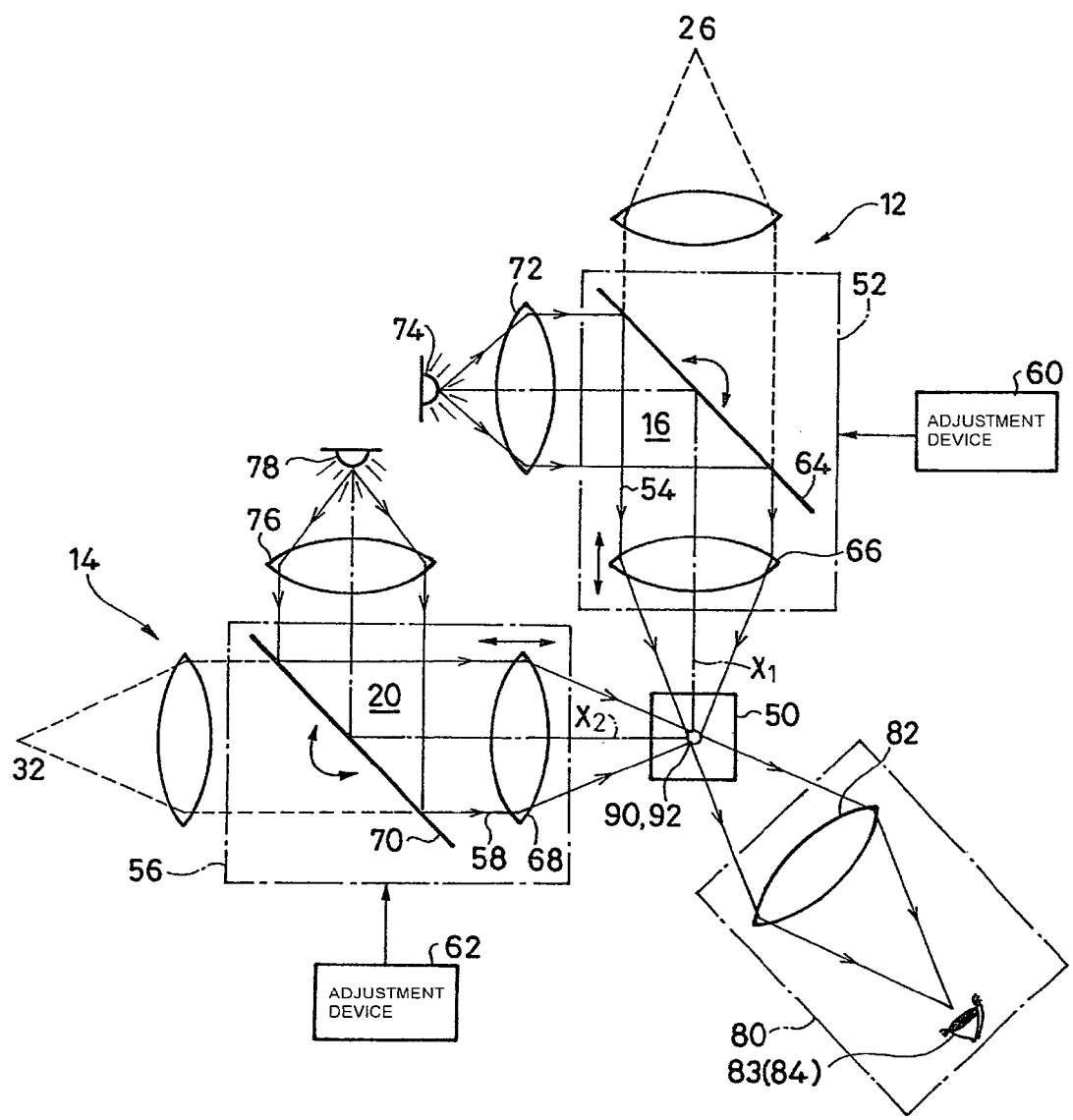
FIG. 2 is a diagram depicting an outlined configuration of axial adjustment devices for an irradiation optical system and a light collecting optical system in the near field analysis apparatus according to the embodiment of the present invention.

In the present embodiment, as shown in FIG. 2, the irradiation optical system 12 includes an irradiation-side adjustable optical system 52 that can change the position and angle of an irradiation-side optical axis $X_1$ thereof. The irradiation optical system 12 irradiates irradiation-side guide light 54 onto the adjustment surface 50 via the irradiation-side adjustable optical system 52.

The light collecting optical system 14 includes a light-collection-side adjustable optical system 56 that can change the position and angle of a light-collection-side optical axis $X_2$ thereof. The light collecting optical system 14 irradiates light-collection-side guide light 58 onto the adjustment surface 50 via the light-collection-side adjustable optical system 56.

The near field analysis apparatus 10 is also provided with an irradiation-side adjustment device 60 and a light-collection-side adjustment device 62.

The irradiation-side adjustment device 60 adjusts the position and angle of the irradiation-side adjustable optical system 52 so that the light spots of the irradiation-side guide light 54 and the light spots of the light-collection-side guide light 58 observed at the adjustment surface 50 match.

Likewise, the light-collection-side adjustment device 62 adjusts the position and angle of the light-collection-side adjustable optical system 56 so that the light spots of the irradiation-side guide light 54 and the light spots of the light-collection-side guide light 58 observed at the adjustment surface 50 match.

Accordingly, in the near field analysis apparatus 10, the optical axis $X_1$ of the irradiation optical system 12 and the optical axis $X_2$ of the light collecting optical system 14 are adjusted by the irradiation-side adjustment device 60 and the light-collection-side adjustment device 62, respectively.

The present embodiment will be described in more detail below.

<Adjustable Optical Systems>

In the present embodiment, it is particularly preferable to use the following configuration as the adjustable optical systems in order to improve the operability.

In the near field analysis apparatus 10, the irradiation-side adjustable optical system 52 includes an irradiation-side focusing optical system 66. The light-collection-side adjustable optical system 56 preferably includes a light-collection-side focusing optical system 68.

Here, the irradiation-side focusing optical system 66 converges the irradiation-side guide light 54 onto the adjustment surface 50. Likewise, the light-collection-side focusing optical system 68 converges the light-collection-side guide light 58 onto the adjustment surface 50.

In the near field analysis apparatus 10, the irradiation-side focusing optical system 66 includes, for example, an irradiation-side optical lens or an irradiation-side focusing mirror. The light-collection-side focusing optical system 68 preferably includes, for example, a light-collection-side optical lens or a light-collection-side focusing mirror.

Here, the irradiation-side focusing mirror includes at least one mirror selected from the group consisting of a spherical mirror, an ellipsoidal mirror, a toroidal mirror, and a Cassegrainian mirror. Likewise, the light-collection-side focusing mirror preferably includes at least one mirror selected from the group consisting of a spherical mirror, an ellipsoidal mirror, a toroidal mirror, and a Cassegrainian mirror.

In the near field analysis apparatus 10, the irradiation-side adjustable optical system 52 includes an irradiation-side angle varying device 64, provided in front of the irradiation-side focusing optical system 66, which can vary the angle about the central axis thereof. The light-collection-side adjustable optical system 56 preferably includes a light-collection-side angle varying device 70, provided after the light-collection-side focusing optical system 68, which can vary the angle about the central axis thereof.

The irradiation-side adjustable optical system 52 focuses the irradiation-side guide light 54 with respect to the adjustment surface 50 based on the position in the optical axis direction of the irradiation-side focusing optical system 66. The irradiation-side adjustable optical system 52 also adjusts the position of the irradiation-side guide light 54 on the adjustment surface 50 based on the angle of the irradiation-side angle varying device 64.

Likewise, the light-collection-side adjustable optical system 56 focuses the light-collection-side guide light 58 based on the position in the optical axis direction of the light-collection-side focusing optical system 68. The light-collection-side adjustable optical system 56 also adjusts the position of the light-collection-side guide light 58 on the adjustment surface 50 based on the angle of the light-collection-side angle varying device 70.

Here, the irradiation-side angle varying device 64 is an irradiation-side beam splitter (irradiation-side planar mirror). Likewise, the light-collection-side angle varying device 70 is preferably a light-collection-side beam splitter (light-collection-side planar mirror).

<Guide Light Emitting Devices>

In the present embodiment, it is particularly preferable to use the guide light emitting devices described below in order to further improve the operability.

The present embodiment includes an irradiation-side collimator lens 72 and an irradiation-side guide light emitting device 74, placed before the irradiation-side angle varying device 64.

The irradiation-side guide light emitting device 74 includes, for example, a laser, a halogen light source, or an LED light source. The irradiation-side guide light emitting device 74 emits the irradiation-side guide light 54, which forms a light spot of the irradiation optical system 12, onto the adjustment surface 50.

The irradiation-side collimator lens 72 collimates the irradiation-side guide light 54 emitted from the irradiation-side guide light emitting device 74.

Thus, the irradiation-side guide light 54 from the irradiation-side guide light emitting device 74 is collimated by the irradiation-side collimator lens 72. This collimated light is reflected at the irradiation-side angle varying device 64, is incident on the irradiation-side focusing optical system 66, and is formed into a converging beam by the irradiation-side focusing optical system 66. When the converging beam is incident on the adjustment surface 50, it forms a light spot of the light-collection-side guide light 54 on the adjustment surface 50.

The present embodiment also includes a light-collection-side collimator lens 76 and a light-collection-side guide light emitting device 78, which are placed before the light-collection-side angle varying device 70.

Here, the light-collection-side guide light emitting device 78 includes, for example, a laser, a halogen light source, or an LED light source. The light-collection-side guide light emitting device 78 emits the light-collection-side guide light 58, which forms a light spot of the light collecting optical system 14, onto the adjustment surface 50.

The light-collection-side collimator lens 76 collimates the light-collection-side guide light 58 emitted from the light-collection-side guide light emitting device 78.

Thus, the light-collection-side guide light 58 from the light-collection-side guide light emitting device 78 is collimated by the light-collection-side collimator lens 76. This collimated light is reflected at the light-collection-side angle varying device 70, is incident on the light-collection-side focusing optical system 68, and is formed into a converging beam by the light-collection-side focusing optical system 68. When this converging beam is incident on the adjustment surface 50, it forms a light spot of the light-collection-side guide light 58 on the adjustment surface 50.

<Light Spot Observing Device>

In the present invention, it is particularly preferable to use the light spot observing device described below in order to further improve the operability.

The present embodiment includes a light spot observing device 80. The light spot observing device 80 includes a microscope optical system 82.

The light spot observing device 80 is placed, for example, in the irradiation optical system 12 or in the light collecting optical system 14. Alternatively, the light spot observing devices 80 may be provided separately from the irradiation optical system 12 and the light collecting optical system 14.

The spot of the irradiation-side guide light 54 emitted onto the adjustment surface 50 via the irradiation optical system 12 and the spot of the light-collection-side guide light 58 emitted onto the adjustment surface 50 via the light collecting optical system 14 are observed with the light spot observing device 80.

In the present embodiment, the spot of the irradiation-side guide light 54 radiated onto the adjustment surface 50 via the irradiation optical system 12 and the spot of the light-collection-side guide light 58 radiated onto the adjustment surface 50 via the light collecting optical system 14 are visually observed with a naked eye 83 or are captured and observed with a CCD camera 84 in the light spot observing device 80 through the microscope optical system 82.

<Adjustment Devices>

In the present embodiment, it is particularly preferable to use the adjustment devices described below in order to further improve the operability.

Specifically, the irradiation-side adjustment device 60 adjusts the position and/or angle of the irradiation-side adjustable optical system 52 so that the spot of the irradiation-side guide light 54 and the spot of the light-collection-side guide light 58, which are observed with the light spot observing device 80, match at the adjustment surface 50.

Likewise, the light-collection-side adjustment device 62 adjusts the position and/or angle of the light-collection-side adjustable optical system 56 so that the spot of the irradiation-side guide light 54 and the spot of the light-collection-side guide light 58, which are observed with the light spot observing device 80, match at the adjustment surface 50.

Figure 3A:
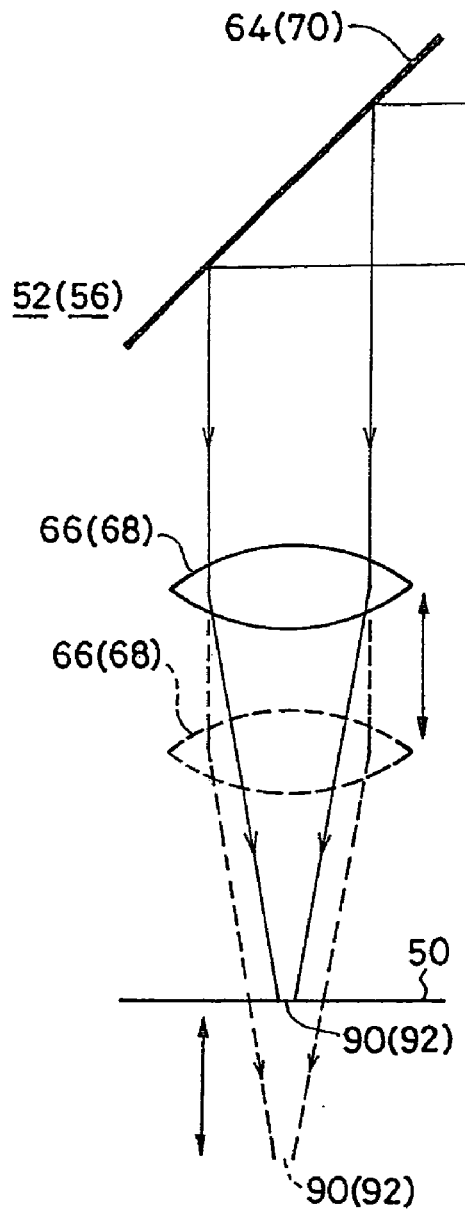
FIGS. 3A and 3B are diagrams showing axial adjustment of the irradiation optical system and the light collecting optical system in the near field analysis apparatus according to the embodiment of the present invention.
Figure 3B:
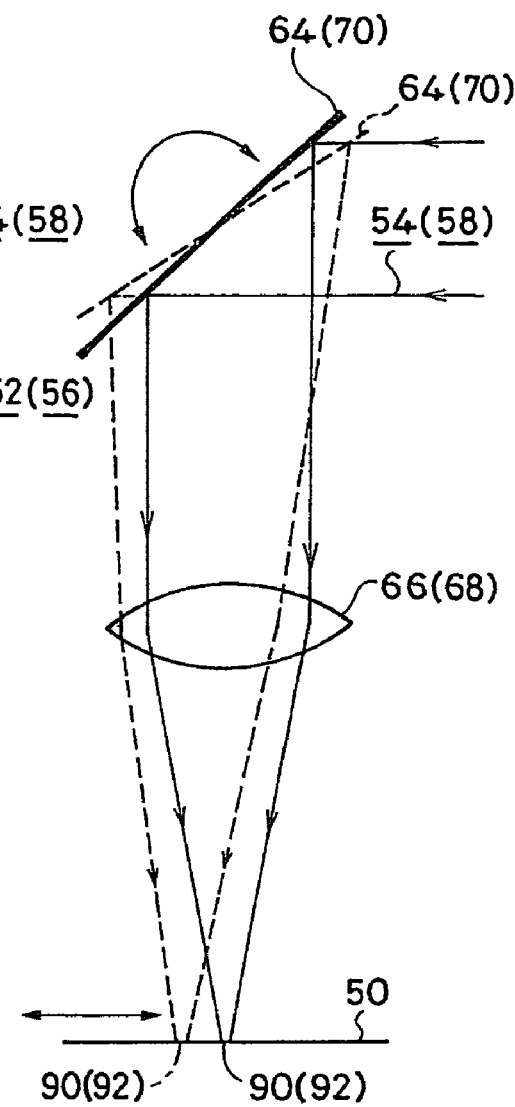

More concretely, as shown in FIG. 3A, the irradiation-side adjustable optical system 52 adjusts the position of an irradiation-side focal point 90 with respect to the adjustment surface 50 by adjusting the position of the irradiation-side focusing optical system 66 in the optical axis direction thereof. Also, as shown in FIG. 3B, the irradiation-side adjustable optical system 52 preferably adjusts the position of the irradiation-side focal point 90 on the adjustment surface 50 by adjusting the angle of the irradiation-side angle varying device 64.

Likewise, as shown in FIG. 3A, the light-collection-side adjustable optical system 56 adjusts the position of a light-collection-side focal point 92 with respect to the adjustment surface 50 by adjusting the position of the light-collection-side focusing optical system 68 in the optical axis direction thereof. Also, as shown in FIG. 3B, the light-collection-side adjustable optical system 56 preferably adjusts the position of the light-collection-side focal point 92 on the adjustment surface 50 by adjusting the angle of the light-collection-side angle varying device 70.

With the axial adjustment devices according to this embodiment, in order to improve the operability when carrying out axial adjustment of the irradiation optical system 12 and the light collecting optical system 14, guide light is emitted from both the irradiation optical system 12 and the light collecting optical system 14. In the present embodiment, the spots of guide light formed on the adjustment surface 50 are observed using the light spot observing device 80. Axial adjustment of the irradiation optical system 12 and the light collecting optical system 14 is carried out with the adjustment devices so that these light spots match.

As a result, in the present embodiment, positioning of the irradiation optical system 12 and the light collecting optical system 14 is carried out while directly observing the light spots.

Furthermore, in the present embodiment, it is possible to easily carry out axial adjustment of the irradiation optical system 12 and the light collecting optical system 14 even though they are placed on the same side of the adjustment surface 50.

Therefore, with the present embodiment, it is possible to optimally and easily carry out axial adjustment of the irradiation optical system 12 and the light collecting optical system 14.

<More Preferable Examples of Adjustment Devices>

Figure 4A:
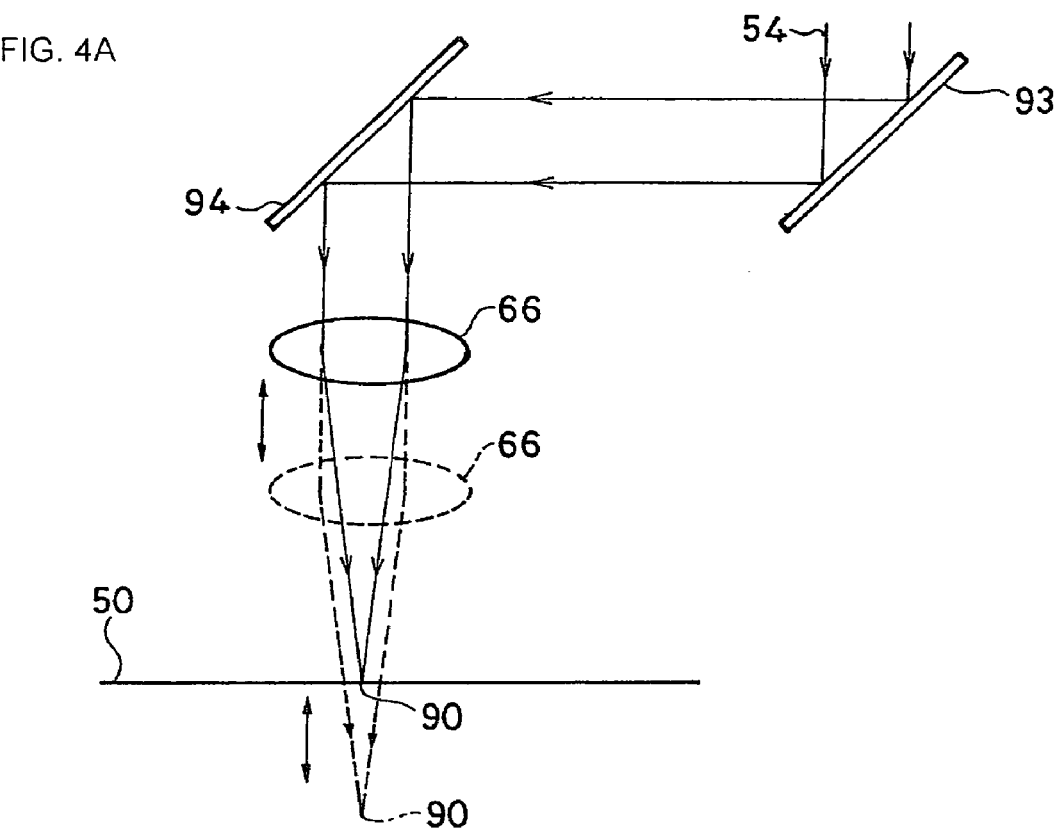
FIGS. 4A and 4B are diagrams showing particularly preferable axial adjustment devices for and axial adjustment of the irradiation optical system and the light collecting optical system in the near field analysis apparatus according to the embodiment of the present invention.
Figure 4B:
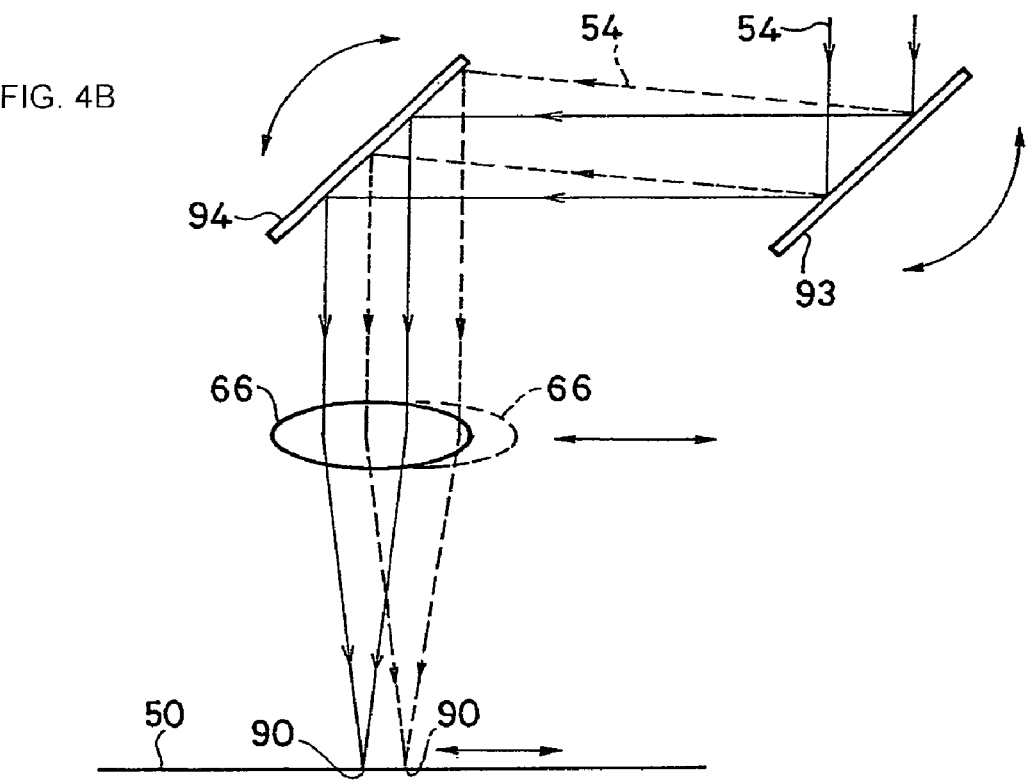

Although the configurations shown in FIGS. 3A and 3B can be used as the adjustable optical systems, it is particularly preferable to use the configurations shown in FIGS. 4A and 4B. These figures show an example of the irradiation-side adjustable optical system, however, it is possible to use this configuration for both the irradiation-side adjustable optical system and the light-collection-side adjustable optical system.

More specifically, when adjusting the position of the optical axis on the adjustment surface, it is necessary to shift the position of the focal point 90 on the adjustment surface, ideally while keeping the optical axis vertical with respect to the optical lens (focusing optical system) 66.

Accordingly, as shown in these figures, two planar mirrors (angle varying devices) 93 and 94 are provided in the optical path between, for example, the beam splitter 64 and the optical lens (focusing optical system) 66 to serve as the adjustable optical systems.

The two planar mirrors 93 and 94 are interlocked with each other and rotate. For example, the two planar mirrors 93 and 94 rotate in conjunction with each other so that a parallelogram is always formed by the two planar mirrors 93 and 94 and the guide light 54, regardless of the rotation angle of the two planar mirrors 93 and 94.

In the present embodiment, the position of the optical lens (focusing optical system) 66 is shifted in parallel to the adjustment surface according to the movement of the position of the optical axis on the adjustment surface due to the two planar mirrors 93 and 94.

For example, as shown in FIG. 4A, the adjustable optical system adjusts the position of the focal point 90 relative to the adjustment surface 50 by adjusting the position of the optical lens (focusing optical system) 66 in the optical axis direction.

Also, as shown in FIG. 4B, in the adjustable optical system, in order to shift the position of the focal point 90 on the adjustment surface while keeping the optical axis vertical with respect to the optical lens (focusing optical system) 66, the two planar mirrors 93 and 94 rotate in association with each other so that a parallelogram is always formed by the two planar mirrors 93 and 94 and the guide light 54, regardless of the rotation angle of the two plane mirrors 93 and 94.

Furthermore, as shown in FIG. 4B, the optical lens (focusing optical system) 66 is also shifted right in the figure to match the right motion of the optical axis due to the two plane mirrors 93 and 94.

With the configuration shown in these drawings, when adjusting the position of the focal point 90 on the adjustment surface, the optical axis is kept vertical with respect to the optical lens (focusing optical system) 66. Therefore, compared with the configuration shown in FIG. 3, it is possible to maintain the ideal optical axis position, namely, keeping the optical axis vertical with respect to the optical lens (focusing optical system) 66, regardless of the optical axis position, particularly on the adjustment surface. Therefore, in the present embodiment, near field analysis can be carried out more accurately.

In the present embodiment, in order to perform optimal and straightforward axial adjustment of the irradiation optical system 12 and the light collecting optical system 14, it is also preferable to employ the axial adjustment devices for the irradiation optical system and the light collecting optical system according to the present embodiment, for example, in the optical systems and the near field analysis apparatus described below.

A near field analysis apparatus of the present invention is preferably employed in, for example, a scattering-type near field microscope, an aperture-type near field microscope, or the like.

Furthermore, a near field analysis apparatus of the present invention is preferably employed in a microscope in which, for example, a sample is placed on an adjustment surface, the sample is excited by an irradiation optical system, and transmitted light, reflected light, scattered light, or emitted light resulting from interaction with the sample is collected for observation with a light collecting optical system.

Here, when the irradiation optical system and the light collecting optical system are transmission-measurement optical systems, it is preferable that they be placed facing each other on the same axis. Furthermore, when the irradiation optical system and the light collecting optical system are transmission measurement optical systems, it is also preferable that they be placed facing each other with respect to the adjustment surface and not on the same axis.

When the irradiation optical system and the light collecting optical system are reflection measurement optical systems, it is preferable that they be placed on the same side with respect to the adjustment surface and not on the same axis.

In the present embodiment, in order to further improve the operability of the near field analysis apparatus, it is extremely important to use, in the near field analysis apparatus, the following adjustment device for the near field optical system, the following interface, the following probe exchange device, the following gonio stage, and the following approaching device for controlling the distance, or similar units.

Adjustment Device for Near Field Optical System

In order to correctly perform near field optical analysis, it is necessary to carry out adjustment of the near field optical system (near field probe).

To achieve this, axial adjustment of the near field probe is generally carried out using as a reference mark the point where reference light, emitted from a laser or the like from the aperture side, irradiates the tip of the near field probe.

However, with this conventional method, the position particularly in the focusing direction is difficult to determine, and it takes some time to perform adjustment to reach the optimal conditions.

Figure 5A:
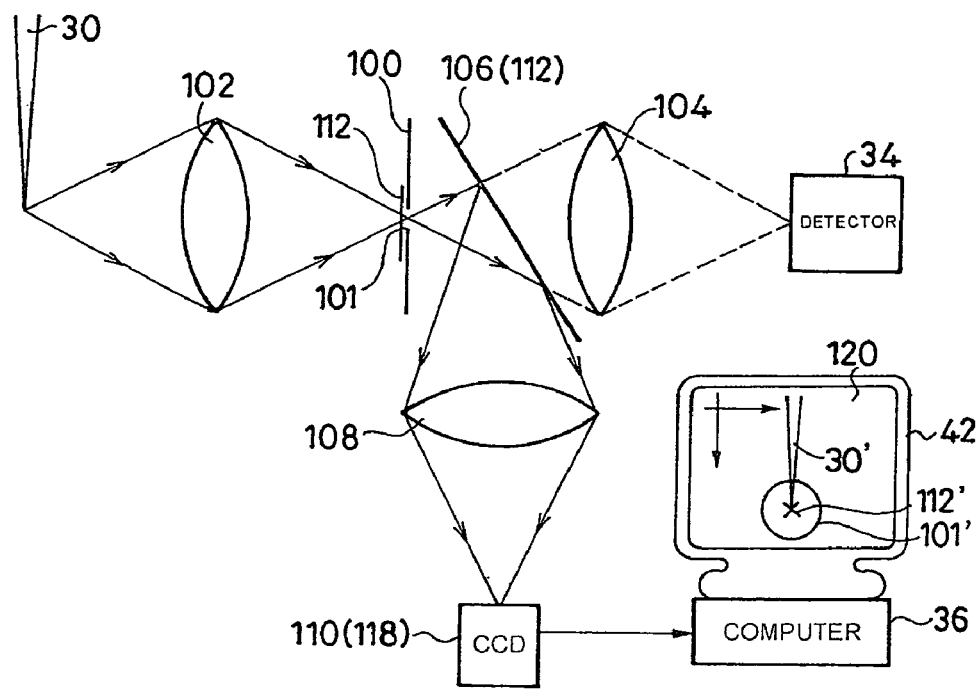
FIGS. 5A and 5B are diagrams showing outlined configurations of adjustment devices for a near field optical system in the near field analysis apparatus according to the embodiment of the present invention.
Figure 5B:
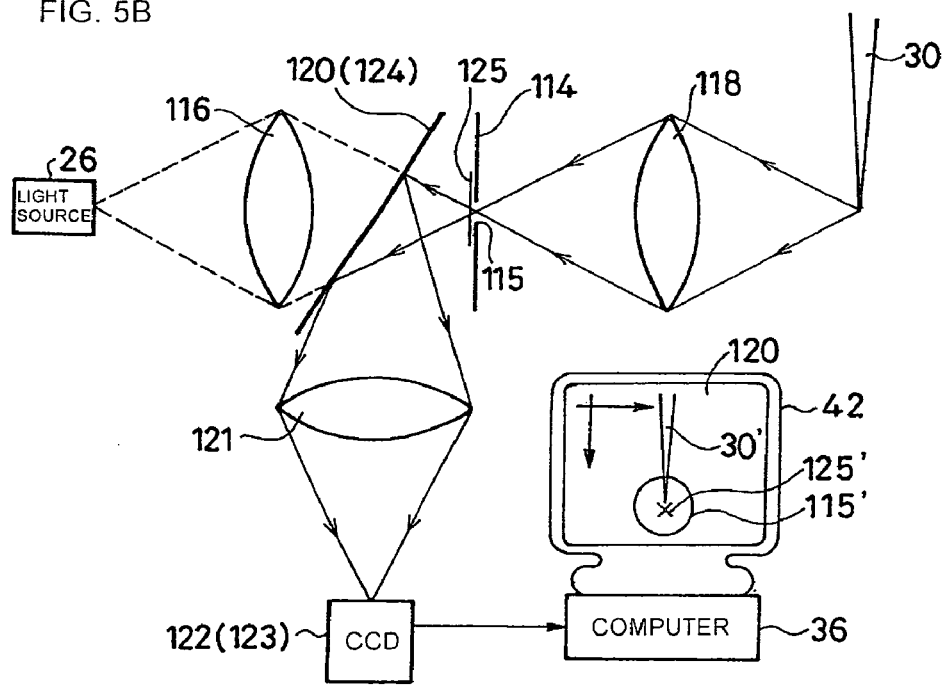

Thus, in the near field analysis apparatus according to the present embodiment, in order to improve the operability when adjusting the near field optical system, it is preferable to employ an adjustment device as shown in FIGS. 5A and 5B for the near field optical system.

The near field optical system shown in FIG. 5A is an optical system for collecting and detecting an emanating electrical field resulting from the interaction between the sample and the near field light generated at the tip of the near field probe.

The near field optical system shown in FIG. 5A includes a third optical lens 102 and a fourth optical lens 104 placed between the near field probe 30 and the detector 34.

<Aperture>

In the present embodiment, to adjust the near field optical system (near field probe 30) shown in FIG. 5A, an aperture 100 is provided on the optical path between the near field probe 30 and the detector 34.

The aperture 100 has a minute opening 101 and is placed at a focal point at the signal detection side. This focal point at the signal detection side is aligned with a rear focal point of the third lens 102 and a front focal point of the fourth lens 104.

The tip of the near field probe 30 is optically observed via the aperture 100 placed at the focal point at the signal detection side, and the position of the tip of the near field probe 30 is adjusted to the center of the aperture 100.

In the near field analysis apparatus according to the present embodiment, the near field optical system can be easily adjusted by visual observation or using the CCD camera, as shown in FIG. 5A.

It is preferable to provide the following beam splitter and indicator target in the adjustment device for the near field optical system shown in FIG. 5A. By doing so, the present invention can more easily perform adjustment of the near field optical system shown in FIG. 5A.

<Beam Splitter>

First, in the near field optical system shown in FIG. 5A, a movable beam splitter 106 is inserted into the optical path extending from the aperture 100 to the detector 34 only while performing adjustment. Also, in the present embodiment, it is preferable to provide a lens 108 and a CCD camera 110 after the movable beam splitter 106. Thus, the tip of the near field probe 30 is observed through the aperture 100, using the CCD camera 110 or by visual observation 118, and the near field optical system is adjusted as described above.

Secondly, in the near field optical system shown in FIG. 5A, it is preferable to always insert a fixed beam splitter 112 into the optical path extending from the aperture 100 to the detector 34. This beam splitter 112 reflects light in a wavelength range used for observation and transmits wavelengths used for measurement, which are different from the observation wavelengths. Thus, in the present embodiment, the tip of the near field probe 30 is observed through the aperture 100, using the CCD camera 110 or by visual observation 118, and the near field optical system is adjusted as described above.

<Indicator Target>

For adjusting the near field optical system shown in FIG. 5A, a indicator target 112 for indicating the central position by, for example, crosshairs or the like is provided at the focal position of the aperture 100. Thus, by simultaneously observing a minute opening image 101' in an aperture image 100', a near field probe image 30', and an indicator target image 112' on a screen 120 of the display 42, preferably, the present embodiment easily carries out adjustment of the near field optical system as described above.

Furthermore, in the present embodiment, it is preferable to use the adjustment described below in the near field optical system shown in FIG. 5B.

Specifically, the near field optical system shown in FIG. 5B is an optical system for collecting and detecting an emanating electrical field resulting from interaction between the sample and a near field generated at the tip of the near field probe 30.

The near field optical system shown in FIG. 5B includes a first optical lens 116 and a second optical lens 118 placed between the excitation light source 26 and the near field probe 30.

<Aperture>

In the present embodiment, in order to adjust the near field optical system shown in FIG. 5B, an aperture 114 is provided in the optical path between the excitation light source 26 and the near field probe 30.

The aperture 114 has a minute opening 115 and is placed at a focal point at the near field excitation side. This focal point at the near field excitation side is aligned with a rear focal point of the first lens 116 and a front focal point of the second lens 118.

In FIG. 5B, the position of the tip of the near field probe 30 is adjusted to the center of the optical aperture 114 while optically observing the tip of the near field probe 30 through the aperture 114 placed at the focal point at the near field excitation side.

By doing so, the near field analysis apparatus according to the present embodiment enables easy adjustment of the near field optical system shown in FIG. 5B, by visual observation.

As the adjustment device for the near field optical system shown in FIG. 5B, it is preferable to provide the beam splitter and indicator target described below. Doing so enables easier adjustment of the near field optical system shown in FIG. 5B in the present embodiment.

<Beam Splitter>

Firstly, in the present embodiment, a movable beam splitter 120 is inserted into the optical path extending from the excitation light source 26 to the aperture 114 only while carrying out adjustment. Furthermore, the present embodiment includes a lens 121 and a CCD camera 122 provided after the beam splitter 120. In the present embodiment, it is preferable to observe the tip of the near field probe 30 through the aperture 114, using the CCD camera 122 or by visual observation 123, while performing adjustment of the near field optical system shown in FIG. 5B.

Secondly, in the present embodiment, a fixed beam splitter 124 is always inserted into the optical path extending from the excitation light source 26 to the aperture 114. This beam splitter 124 reflects light in a wavelength range used for observation and transmits wavelengths used for measurement, which are different from the observation wavelengths. Thus, in the present embodiment, it is preferable to observe the tip of the near field probe 30 through the aperture 114, using the CCD camera 122 or by visual observation 123, while performing adjustment of the near field optical system shown in FIG. 5B.

<Indicator Target>

For adjusting the near field optical system shown in FIG. 5B, an indicator target 125 for indicating the central position by, for example, crosshairs or the like, is provided at the focal point in the aperture 114. Then, in the present embodiment, it is preferable to perform adjustment of the near field optical system shown in FIG. 5B by simultaneously observing a minute opening image 115' in an aperture image 114', a near field probe image 30', and an indictor target image 125' on the screen 120 of the display 42.

Interface

In order to correctly carry out near field analysis, it is necessary to combine a plurality of spectral systems in the near field analysis apparatus. Therefore, in the near field analysis apparatus, it is necessary to operate each device (each spectral system) constituting the near field analysis apparatus via an interface.

To achieve this, each constituent device has generally been operated via its own interface.

However, in the near field analysis apparatus, if the interfaces for the constituent devices are different, the way of using them and their operations are different too, and therefore, the operability of the overall near field analysis apparatus deteriorates. If the number of constituent devices in the near field apparatus is large, particularly in a multi-wavelength near field spectral analysis apparatus, this problem becomes more severe.

Therefore, in the near field analysis apparatus according to the present embodiment, in order to improve the operability of each constituent device, it is preferable to use software that can control each constituent device of the near field analysis apparatus with the same interface.

Accordingly, the user can operate each spectral system using the same method and operation manual regardless of the type of devices constituting the near field analysis apparatus.

<Interface>

The term interface, as used here, includes items for each device that are displayed on a screen by the software, and procedures, techniques, or specifications for each type of device, which are required for using each device.

<Constituent Devices>

Constituent devices (spectral systems) of the near field apparatus include devices required for near field analysis using the near field analysis apparatus, for example, Fourier transform spectrometers, dispersive type spectrometers, filter type spectrometers, wavelength-tunable lasers, and wavelength-tunable light sources.

<Illustrative Examples>

Figure 6:
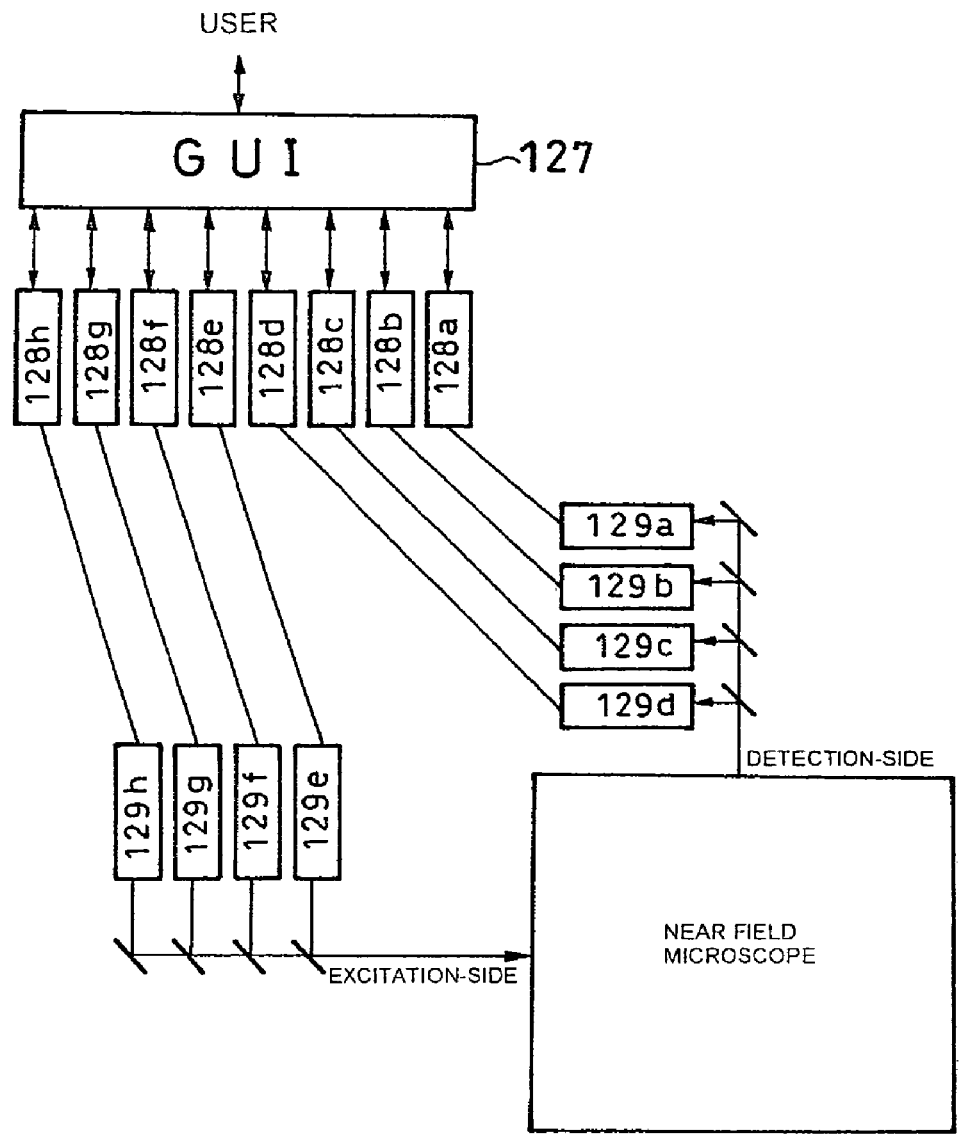
FIG. 6 is a diagram showing an interface used in the near field analysis apparatus according to the embodiment of the present invention.

In the near field analysis apparatus, it is preferable to use a graphical user interface (hereinafter referred to as a GUI) 127 as shown, for example, in FIG. 6. In FIG. 6, drivers 128a to 128d are connected to respective spectral systems (constituent devices) 129a to 129d. In addition, drivers 128e to 128h are respectively connected to individual devices 129e to 129h other than the spectral systems mentioned above, for example, light sources (lasers or the like).

Thus, using the GUI 127 in common, the user can perform operations such as setting, instructing, and so forth for inputting measurement data from the individual devices 129a to 129d, and operations such as setting, instructing, and so forth for outputting control values to the individual devices 129e to 129h, irrespective of the configurations of the devices 129a to 129h, connected to the near field analysis microscope (near field analysis apparatus).

Near Field Probe Exchange Device

To perform near field analysis, it is essential to be able to exchange the near field probe and to access the sample.

To achieve this, in order to allow easy access to a near field-probe attaching part when exchanging the near field probe, it has generally been necessary to remove a block to which the near field probe is attached, or to remove the sample.

However, with a design in which mechanical stiffness is ensured, it is difficult to remove the near field probe. On the other hand, with a design allowing easy removal of the near field probe, the mechanical stiffness is sacrificed, the stability of the apparatus is deteriorated, and it is necessary to readjust the position of the near field probe and to reposition the sample.

Therefore, in the near field analysis apparatus according to the present embodiment, in order to improve the operability when exchanging the near field probe 30 or when accessing the sample 16, it is preferable to provide a hatch-type probe exchange device 130, as shown in FIGS. 7A to 7C.

FIG. 7A shows a side view of the hatch-type probe exchange device 130 when closed. FIG. 7B is a top view of the hatch-type probe exchange device 130 when closed. FIG. 7C is a side view of the hatch-type probe exchange device 130 when opened.

<Hatch Configuration>

As shown in FIGS. 7A and 7B, the hatch-type probe exchange device 130 includes a base block 132, a probe block 134, and an opening-and-closing mechanism 136.

The base block 132 includes an opening 138 for exposing the near field probe 30 in the direction of the sample 16.

The probe block 134 can be opened and closed like a hatch by rotating about a rotation axis parallel to the sample surface through the opening-and-closing mechanism 136 with respect to the base block 132, and holds the near field probe 30 in a detachable manner.

Therefore, as shown in FIG. 7C, in the hatch-like probe 130, the probe block 134 opens like a hatch with respect to the base block 132 by rotating about the rotation axis parallel to the sample surface. With this configuration, the present embodiment allows the near field probe 30 to be easily exchanged and also allows separate access to the sample 16.

As a result, in the near field analysis apparatus 10 according to the present embodiment, it is possible to achieve both mechanical stiffness and stability by using the hatch-type probe exchange device 130 shown in FIGS. 7A to 7C.

In order to ensure that the hatch-type probe exchange device 130 shown in FIGS. 7A to 7C is positioned with good repeatability each time the probe is exchanged, it is preferable to position it by abutment or by using a positioning pin when in the closed state shown in FIG. 7A.

<Sliding Configuration>

Figure 8A:
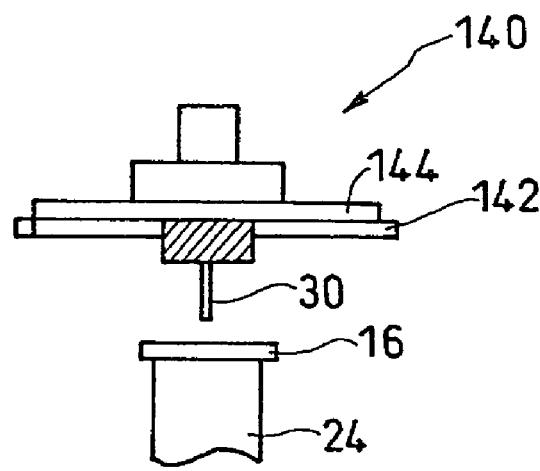
FIGS. 8A, 8B, and 8C are diagrams showing an outlined configuration of a sliding-type probe exchange device in the near field analysis apparatus according to the embodiment of the present invention.
Figure 8B:
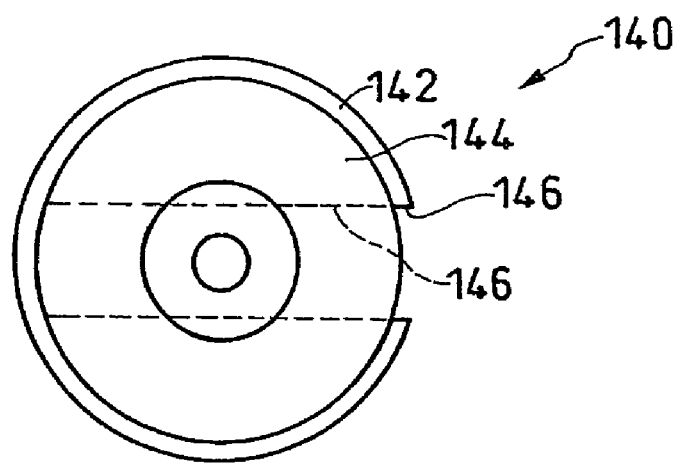
Figure 8C:
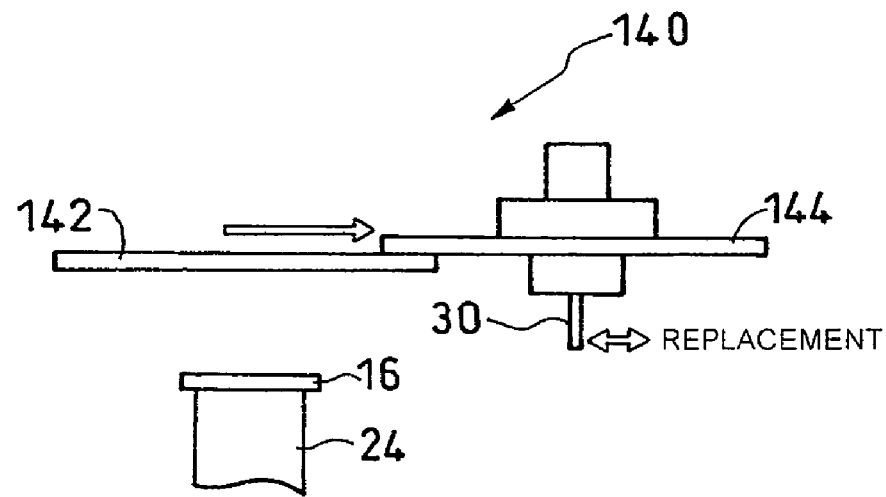

In the near field analysis apparatus according to the present embodiment, in order to improve the operability when exchanging the near field probe 30 and when accessing the sample 16, it is preferable to provide a sliding-type probe exchange device 140, as shown in FIGS. 8A to 8C.

FIG. 8A is a side view of the sliding-type probe exchange device 140 when closed; FIG. 8B is a top view of the sliding-type probe exchange device 140 when closed; and FIG. 8C is a side view of the sliding-type probe exchange device 140 when open.

In the present embodiment, as shown in FIGS. 8A and 8B, the sliding-type probe exchange device 140 includes a base block 142 and a probe block 144.

The base block 142 has an opening 146 for exposing the near field probe 30 in the direction of the sample 16.

The probe block 144 can slide horizontally with respect to the base block 142 in a direction parallel to the sample surface and holds the near field probe 30 in a detachable manner.

With this sliding-type probe exchange device 140, as shown in FIG. 8C, the probe block 144 moves relative to the base block 142 to a position allowing access to the near field probe 30 by sliding horizontally, parallel to the sample surface. In this state, the present embodiment allows the near field probe 30 to be easily exchanged and allows separate access to the sample 16.

As a result, in the near field analysis apparatus 10 according to the present embodiment, it is possible to achieve both mechanical stiffness and stability by using the sliding-type probe exchange device 140 shown in FIGS. 8A to 8C.

In order to ensure that the sliding-type probe exchange device 140 shown in FIGS. 8A to 8C is positioned with good repeatability each time the probe is exchanged, it is preferable to position it by abutment or by using a positioning pin when in the measurement state shown in FIG. 8A.

Gonio Stage

To perform near field analysis, it is necessary to adjust the angle of the sample stage.

In general, if the sample is tilted, the tip of the near field probe may touch the sample, making it impossible to correctly carry out near field measurement.

Therefore, in the related art, the provision of a conventional gonio stage above the sample stage has been considered.

However, in near field analysis, since it is generally necessary to make the sample stage as light as possible compared to the analysis apparatus, it is not feasible to provide a conventional gonio stage.

Figure 9:
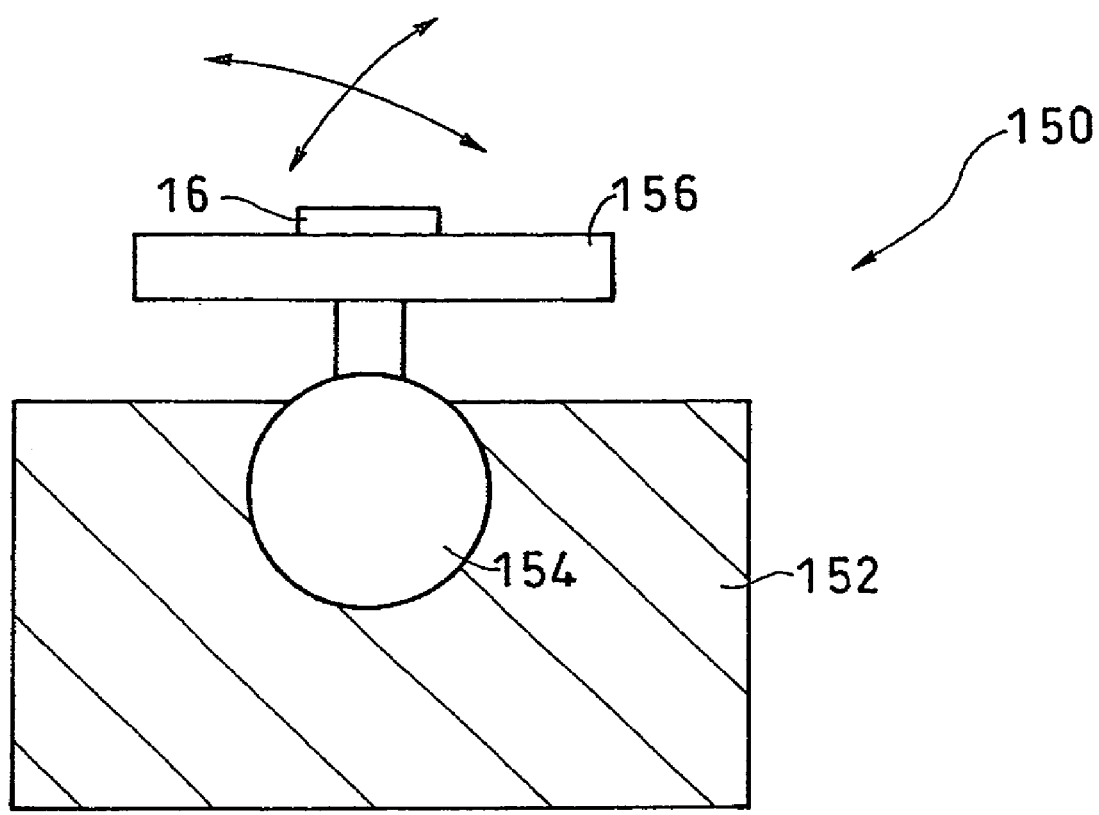
FIG. 9 is a diagram showing an outlined configuration of a gonio stage used in the near field analysis apparatus according to the embodiment of the present invention.

Thus, in the near field analysis apparatus according to the present embodiment, it is preferable to use a gonio stage 150 as shown in FIG. 9.

The gonio stage 150 shown in FIG. 9 includes a base 152, a ball magnet 154, and a sample platform 156. The gonio stage 150 is installed, for example, on the sample stage.

Here, the base 152 is formed of a magnetic substance.

The ball magnet 154 is provided such that its angle with respect to the base 152 can be varied and the set angle with respect to the base 152 is maintained by means of magnetic force.

The sample platform 156 is fixed to the ball magnet 154 and the angle thereof with respect to the base 152 is varied together with the ball magnet 154. The sample platform 156 is used for mounting the sample 16.

The gonio stage 150 shown in FIG. 9 makes the surface of the sample 16 horizontal by rotating the ball magnet 154 in the socket therefore to rotate the sample platform 156, which is fixed to the ball magnet 154, by the angle corresponding to the angle of the surface of the sample 16.

As a result, in the near field analysis apparatus 10 according to the present embodiment, it is possible to easily adjust the angle using a compact, lightweight gonio stage 150, as shown in FIG. 9.

When using the gonio stage 150 shown in FIG. 9, it is preferable to sandwich the bottom surface of the stage and the top surface of the sample between clamps that are already horizontal to make physical contact therewith, or to use an angle-adjusting jig which is made horizontal by visual observation.

Approaching Device For Distance Control

Before commencing near field analysis, the near field probe and the sample are normally separated by a distance significantly greater than that used for analysis. When commencing analysis, therefore, it is necessary to first set the separation between the near field probe and the sample equal to the predetermined distance (target value) required for analysis.

Figure 10A:
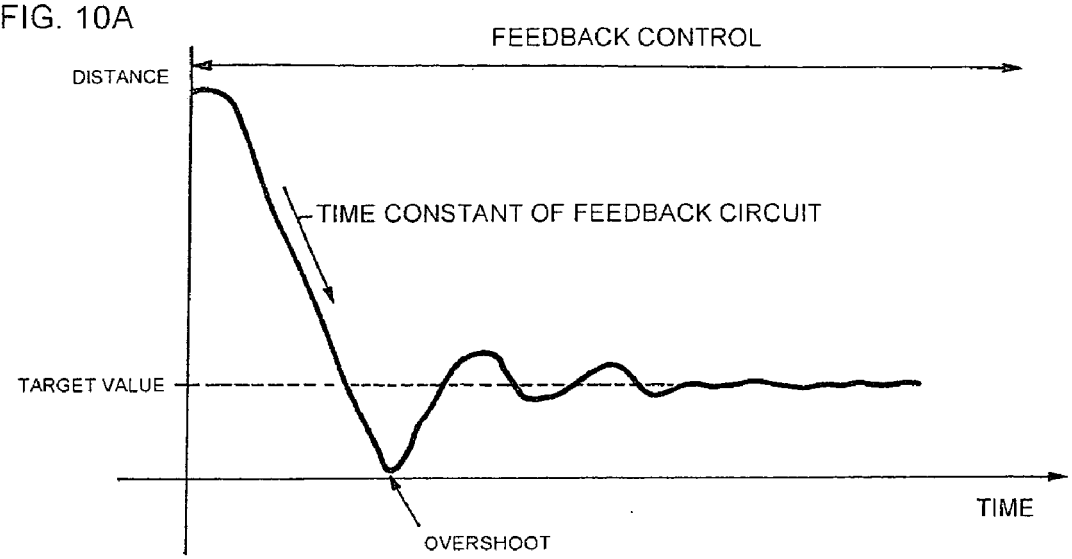
FIGS. 10A and 10B are graphs for comparing distance control of the distance between a near field probe and a sample with a general near field analysis apparatus, and distance control of the distance between a near field probe and a sample with the near field analysis apparatus according to the embodiment of the present invention.

This has been achieved in the conventional method by directly controlling the distance between the near field probe and the sample based on feedback control with a feedback circuit, as shown in FIG. 10A.

However, for near field analysis, the distance between the near field probe and the sample for analysis is much closer than the distance required for general analysis. In near field analysis, therefore, by utilizing the same type of distance control normally used in general analysis in distance control for near field analysis, when the probe and the sample approach each other, overshoot occurs due to the control constants (for example, the PID value) of the feedback circuit, which causes the near field probe and the sample to crash into each other. Furthermore, in the conventional method, the time required for providing feedback is long.

Figure 10B:
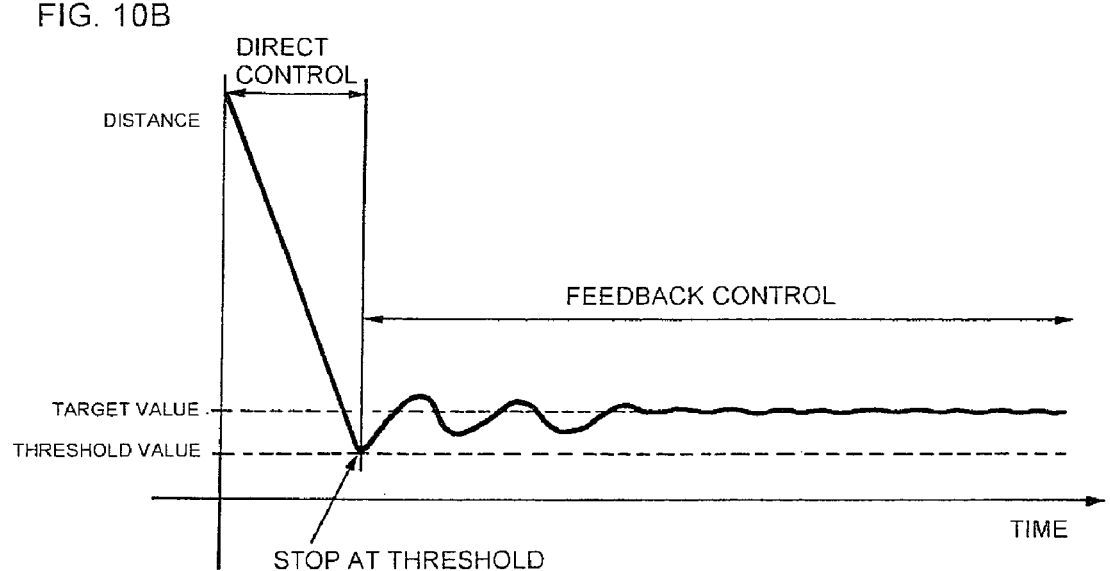

In contrast, in the present invention, in order to prevent the near field probe and the sample from crashing into each other, a threshold related to the distance between the near field probe and the sample is set, as shown in FIG. 10B. Then, when the near field probe and the sample initially approach each other while they are separated by a distance larger than the threshold, feedback control is not carried out and direct control is performed instead.

More specifically, in the present embodiment, when initially approaching each other, a precision motion stage is directly controlled, while monitoring a signal indicating the distance between the sample and the near field probe, to reduce the distance between the sample and the near field probe. Thus, in the present embodiment, when the distance signal crosses the threshold value, distance control using the precision motion stage is handed over to a feedback circuit, which then carries out feedback control.

Figure 11A:
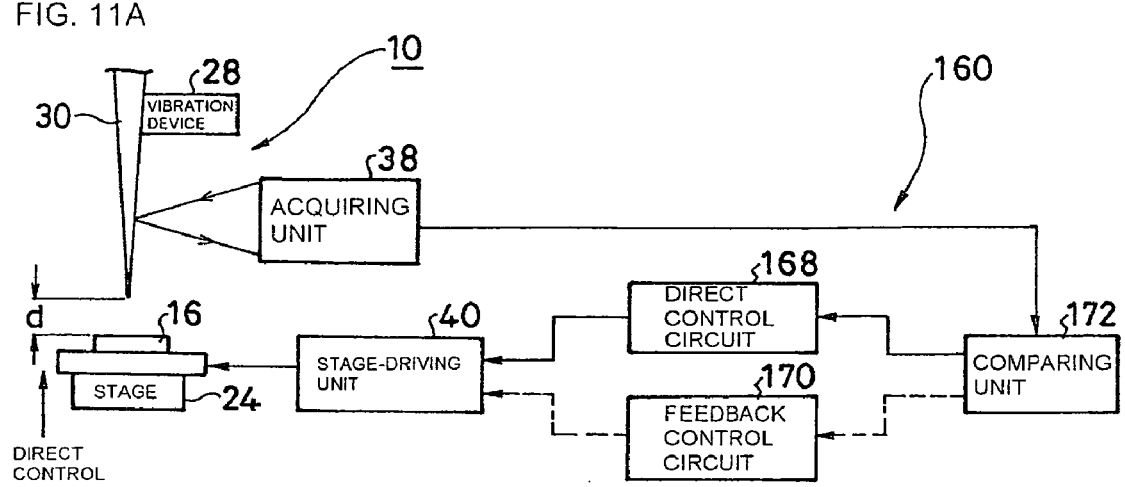
FIGS. 11A and 11B are diagrams showing an outlined configuration of an approaching device used in the near field analysis apparatus according to the embodiment of the present invention.
Figure 11B:
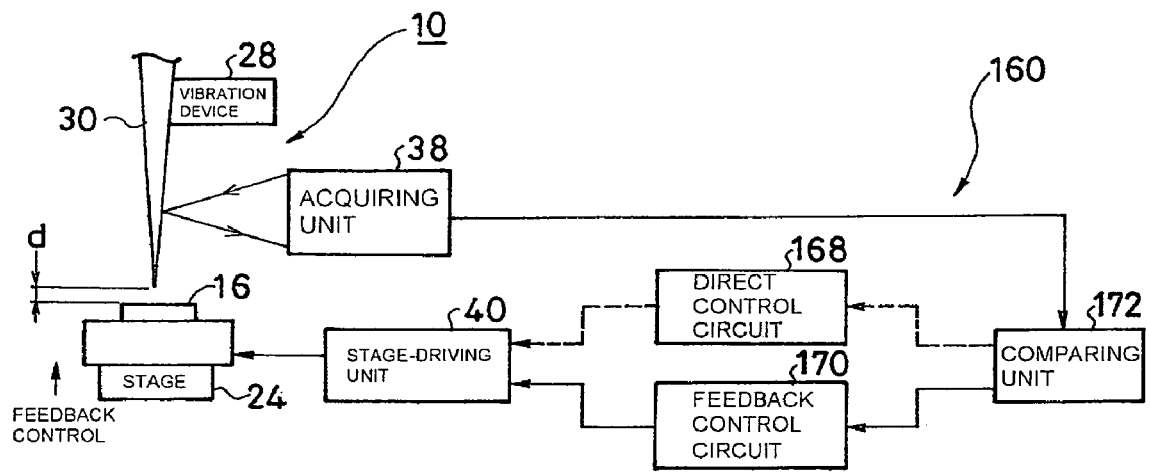

The present embodiment includes an approaching device 160, as shown in FIGS. 11A and 11B.

When the distance (d) between the near field probe 30 and the sample 16 is larger than the threshold value, as shown in FIG. 11A, the approaching device 160 directly controls the separation between the near field probe 30 and the sample 16. On the other hand, when the distance (d) between the near field probe 30 and the sample 16 is smaller than the threshold value, as shown in FIG. 11B, the approaching device 160 performs feedback control of the separation between the near field probe 30 and the sample 16.

To achieve this, the approaching device 160 includes a distance-information acquiring unit 38, a stage 24, a stage-driving unit 40, a direct-control circuit 168, a feedback-control circuit 170, and a comparing unit 172.

Here, the distance-information acquiring unit 38 monitors the distance between the near field probe 30 and the sample 16.

The stage 24 can move in the directions of the X and Y axes (scanning directions) and in the direction of the Z axis (approaching/separating direction). The sample 16 is placed on the stage 24.

The stage-driving unit 40 moves the stage 24 in each axial direction.

The direct-control circuit 168 directly controls the distance in the Z-axis direction of the stage 24, while monitoring the distance signal from the distance-information acquiring unit 38, to perform high-speed coarse movement of the stage 24.

The feedback-control circuit 170 feeds back the distance signal from the distance-information acquiring unit 38 to the stage 24. By performing such feedback control of the stage 24, the present embodiment carries out precise movement of the stage 24 to control the distance between the near field probe 30 and the sample 16 to a desired distance (target value).

The comparing unit 172 compares the threshold value related to the distance between the near field probe 30 and the sample 16, which is determined in advance based on the separation (target value) required for near field analysis, and the distance between the near field probe 30 and the sample 16 obtained based on the distance signal from the distance-information acquiring unit 38.

During the initial approach shown in FIG. 11A (before the distance signal reaches the threshold), the comparing unit 172 directly controls the stage 24 with the direct-control circuit 168, while monitoring the distance signal from the distance-information acquiring unit 38, to reduce the distance between the near field probe 38 and the sample 16 at high speed.

Then, when the distance signal crosses the threshold, as shown in FIG. 11B, the comparing unit 172 hands over control of the stage 24 to the feedback-control circuit 170 to control the distance between the near field probe 30 and the sample 16 based on this feedback control with the feedback-control circuit 170.

Therefore, by using this approaching device 160 in the present embodiment, it is possible to reliably and quickly perform feedback without making the near field probe 30 and the sample 16 crash into each other.

In the present embodiment, it is preferable to detect the lateral shifting motion of the near field probe 30 and to generate the distance signal based on this lateral shifting motion.

To achieve this, the present embodiment includes a vibrating device 28.

The vibrating device 28, which is provided in the near field probe 30, vibrates the near field probe 30 in the lateral direction, which causes the near field probe to exhibit lateral shifting motion.

The distance-information acquiring unit 38 detects the lateral shifting motion of the near field probe 30 and outputs a distance signal indicating the distance between the near field probe 30 and the sample 16 based on the detected lateral shifting motion of the near field probe 30.

What is claimed is:

1. A near field analysis apparatus comprising:
    an irradiation optical system for irradiating a sample with excitation light, the irradiation optical system comprising an irradiation-side adjustable optical system for adjusting the position and/or angle of an irradiation-side optical axis thereof, and irradiating irradiation-side guide light onto an adjustment surface via the irradiation-side adjustable optical system;
    a light collecting optical system for collecting detection light produced by interaction between the sample and near field light generated by the excitation light, the light collecting optical system comprising a light-collection-side adjustable optical system for adjusting the position and/or angle of a light-collection-side optical axis thereof, and irradiating light-collection-side guide light onto the adjustment surface via the light-collection-side adjustable optical system;
    an irradiation-side adjustment device for adjusting the position and/or angle of the irradiation-side adjustable optical system such that a spot of the irradiation-side guide light and a spot of the light-collection-side guide light, which are observed at the adjustment surface, match; and
    a light-collection-side adjustment device for adjusting the position and/or angle of the light-collection-side adjustable optical system such that the spot of the irradiation-side guide light and the spot of the light-collection-side guide light, which are observed at the adjustment surface, match;
    wherein optical-axis adjustment of the irradiation optical system and/or optical-axis adjustment of the light collecting optical system are performed using the irradiation-side adjustment device and/or the light-collection-side adjustment device, respectively.

2. A near field analysis apparatus according to claim 1, further comprising:
    an irradiation-side guide light emitting device for making the irradiation-side guide light forming the light spot of the irradiation optical system at the adjustment surface incident on the irradiation optical system; and
    a light-collection-side guide light emitting device for making the light-collection-side guide light forming the light spot of the light collecting optical system at the adjustment surface incident on the light collecting optical system.

3. A near field analysis apparatus according to claims 2, further comprising:
    a light spot observing device for observing the spot of the irradiation-side guide light irradiated onto the adjustment surface via the irradiation optical system and the spot of the light-collection-side guide light irradiated onto the adjustment surface via the light collecting optical system;
    wherein the irradiation-side adjustment device adjusts the position and/or angle of the irradiation-side adjustable optical system such that the spot of the irradiation-side guide light and the spot of the light-collection-side guide light, which are observed with the light spot observing device, match at the adjustment surface; and the light-collection-side adjustment device adjusts the position and/or angle of the light-collection-side adjustable optical system such that the spot of the irradiation-side guide light and the spot of the light-collection-side guide light, which are observed with the light spot observing device, match at the adjustment surface.

4. A near field analysis apparatus according to claims 3, wherein:

the irradiation-side adjustable optical system comprises an irradiation-side focusing optical system for converging the irradiation-side guide light towards the adjustment surface; and the light-collection-side adjustable optical system comprises a light-collection-side focusing optical system for converging the light-collection-side guide light towards the adjustment surface.

5. A near field analysis apparatus according to claim 4, wherein:

the irradiation-side focusing optical system comprises an irradiation-side optical lens or an irradiation-side focusing mirror; and the light-collection-side focusing optical system comprises a light-collection-side optical lens or a light-collection-side focusing mirror.

6. A near field analysis apparatus according to claim 5, wherein:

the irradiation-side focusing mirror comprises at least one mirror selected from the group consisting of a spherical mirror, an ellipsoidal mirror, a toroidal mirror, and a Cassegrainan mirror; and the light-collection-side focusing mirror comprises at least one mirror selected from the group consisting of a spherical mirror, an ellipsoidal mirror, a toroidal mirror, and a Cassegrainian mirror.

7. A near field analysis apparatus according to claims 4, wherein:

the irradiation-side adjustable optical system comprises an irradiation-side angle varying device which is provided before the irradiation-side focusing optical system and which can vary the angle about a central axis thereof, focuses the irradiation-side guide light with respect to the adjustment surface based on the position of the irradiation-side focusing optical system in the optical axis direction, and adjusts the position of the irradiation-side guide light on the adjustment surface based on the angle of the irradiation-side angle varying device; and the light-collection-side adjustable optical system comprises a light-collection-side angle varying device which is provided after the light-collection-side focusing optical system and which can vary the angle about a central axis thereof, focuses the light-collection-side guide light with respect to the adjustment surface based on the position of the light-collection-side focusing optical system in the optical axis direction, and adjusts the position of the light-collection-side guide light on the adjustment surface based on the angle of the light-collection-side angle varying device.

8. A near field analysis apparatus according to claim 7, wherein:

the irradiation-side angle varying device is an irradiation-side planar mirror; and the light-collection-side angle varying device is a light-collection-side planar mirror.

* * * * *